United States Patent

Schoubye

[11] Patent Number: 6,090,364
[45] Date of Patent: Jul. 18, 2000

[54] PROCESS FOR CONCENTRATION OF SULPHURIC ACID

[75] Inventor: Peter Schoubye, Hørsholm, Denmark

[73] Assignee: Haldor Topsoe A/S, Lyngby, Denmark

[21] Appl. No.: 08/976,312

[22] Filed: Nov. 21, 1997

Related U.S. Application Data

[60] Provisional application No. 60/031,837, Nov. 26, 1996.

[51] Int. Cl.⁷ .................................................. C01B 17/69
[52] U.S. Cl. ............................................................ 423/522
[58] Field of Search ............................................. 423/522

[56] References Cited

U.S. PATENT DOCUMENTS

| | | | |
|---|---|---|---|
| 1,896,287 | 2/1933 | Clark | 423/522 |
| 2,879,135 | 3/1959 | Haltmeier | 423/522 |
| 3,374,061 | 3/1968 | Topsoe et al. | 423/522 |
| 3,815,667 | 6/1974 | Brown | 423/522 |
| 3,950,493 | 4/1976 | Dorr et al. | 423/522 |
| 4,029,751 | 6/1977 | Dorr et al. | 423/522 |
| 4,212,855 | 7/1980 | Kerner et al. | 423/522 |
| 4,348,373 | 9/1982 | Schoubye | 423/522 |
| 4,659,556 | 4/1987 | Eros | 423/522 |
| 5,108,731 | 4/1992 | Schoubye | 423/522 |
| 5,198,206 | 3/1993 | Schoubye | 423/522 |

*Primary Examiner*—Gary P. Straub
*Attorney, Agent, or Firm*—Ostrolenk, Faber, Gerb & Soffen, LLP

[57] ABSTRACT

The present invention provides a process for concentrating sulphuric acids with concentrations of 90% to 98% $H_2SO_4$ and temperatures of 160° C. to 270° C. into sulphuric acid with concentrations of 96% to 98.8% $H_2SO_4$ by contacting the acid countercurrently in a packed tower with hot air or with hot process gas containing up to 6% $SO_3$ and up to 30% $H_2O$ and with inlet temperatures to the tower of 350° C to 600° C. The $H_2O$ and $H_2SO_4$ evaporated in the tower is contained in a stream of offgas from which the $H_2SO_4$ thereafter is removed by controlled condensation The invention relates, in particular, to concentrating the product acid from wet gas sulphuric acid plants in which condensation of $H_2SO_4$ takes place in the presence of excess $H_2O$ in the process gas in air cooled, vertical glass tubes.

4 Claims, 4 Drawing Sheets

PROCESS FOR CONCENTRATION OF SULPHURIC ACID

This application claims the benefit of U.S. Provisional Application Serial No. 60/031,837, filed Nov. 26, 1996.

BACKGROUND OF THE INVENTION

A number of processes for concentration of sulphuric acid up to concentrations of 96%–98% $H_2SO_4$ are known and summarized in Ullmann's Encyclopedia of Industrial Chemistry, Vol. A25, pages 687–690, Springer Verlag 1995. Such process include:

Boiling the sulphuric acid under vacuum, typically in a circulating evaporator at 15–50 mbar absolute pressure in the flash evaporator vessel. The vapors are fractionated in a column, whereby most of the $H_2SO_4$ is separated from the $H_2O$ vapor and returned to the flash vessel. Vacuum concentration of sulphuric acid is based on well known distillation principles and 98% acid strength can be achieved, but investment and operating costs are high.

Concentration of sulphuric acid at atmospheric pressure is known in various variants, for example:

The Chemico direct-fired drum concentrator in which hot flue gas from combustion of oil or gas is passed through a number of vessels in which the flue gas is passed through an immersion tube into the acid to be concentrated. The acid flows countercurrently with the gases through the vessels arranged in cascade fashion, as shown in FIG. 45 page 688 in Ullmann. The most serious draw-back of this process is severe corrosion problems and the formation of a large amount of offgas with high content of sulphuric acid fumes that are difficult to remove before the gas can be emitted to the atmosphere. These problems increase with the attempted strength of the product acid and 98% $H_2SO_4$ can hardly be achieved.

The Pauling-Plinke process in which the acid is boiled in an indirectly heated pan, and the vapors are fractionated in a distillation column. Corrosion problems are severe and 98% $H_2SO_4$ are difficult to achieve.

The Bayer-Bertrams process, described in detail by Kung and Reimann in reference (143) in Ullmann, in which the acid is concentrated in a number of indirectly heated, circulating evaporators connected in series. 98% $H_2SO_4$ can only be achieved by the use of vacuum in the last one of the circulating evaporators.

SUMMARY OF THE INVENTION

The present invention provides a process for concentrating sulphuric acids with concentrations of 90% to 98% $H_2SO_4$ and temperatures of 150° C. to 270° C. (preferably 160° C. to 270° C.) into sulphuric acid with concentrations of 96% to 98.8% $H_2SO_4$ by contacting the acid, suitably at atmospheric pressure, countercurrently in a packed tower with hot air or with hot process gas from a sulphuric acid plant, suitably a gas containing up to 6% $SO_3$ and up to 30% $H_2O$ and with inlet temperatures to the tower of 350° C. to 600° C.

The $H_2O$ and $H_2SO_4$ evaporated in the tower is contained in a stream of offgas from which the $H_2SO_4$ thereafter is removed by controlled condensation as described in U.S. Pat. Nos. 5,108,731, 5,198,206, and 4,348,373, the disclosures of which are herein incorporated by reference. In particular, the $H_2SO_4$ in the offgas from the tower is condensed in vertical glass tubes of an air-cooled falling film condenser or in a packed concentrating tower in which the gas is contacted countercurrently with circulating sulphuric acid that exits the tower at a temperature of 160°–260° C.

The invention relates, in particular, to concentrating the product acid from wet gas sulphuric acid plants in which condensation of $H_2SO_4$ takes place in the presence of excess $H_2O$ in the process gas in air cooled, vertical glass tubes as described in U.S. Pat. No. 5,108,731. In one embodiment of the invention, particles are added to the offgas from the concentrating tower, as described in U.S. Pat. No. 5,198,206. The inlet gas to the concentrating tower is air suitably at 350°–600° C. and the offgas from the tower may be mixed into the inlet stream of the sulphuric acid condensing tower of a wet gas sulfuric acid plant as described in U.S. Pat. No. 5,108,731. Alternatively, the inlet gas to the tower may be process gas from a stream exiting an $SO_3$ absorber and the offgas from the concentrating tower may be mixed into a stream upstream of the sulfuric acid condensing tower of a wet gas sulfuric acid plant as described in U.S. Pat. No. 5,108,731. Alternatively, the inlet gas to the concentrating tower may be process gas from the stream exiting an $SO_3$ absorber in a dry gas sulfuric acid plant and the offgas from the evaporating tower may be mixed into a stream upstream thereof, as described in U.S. Pat. No. 5,108,731.

The offgas from the evaporating tower may be mixed with hot air or hot process gas from the sulphuric acid plant, the temperature of said hot air or hot gas being above the temperature of the gas exiting the evaporating tower.

The present invention has advantages over known processes for concentration of sulphuric acid, and in particular for concentration of sulphuric acid produced in Wet Gas sulphuric acid plants, which are:

(a) hot air or hot process gas, that in any case is produced in the sulphuric acid plant, is utilized for concentrating the acid;

(b) the concentration of the acid takes place in a packed evaporating tower, which is more efficient for contacting the gas with the acid and gives a higher number of transfer units than e.g. the above Chemico process;

(c) the sulphuric acid fumes in form of $H_2SO_4$ vapor and acid mist in the offgas from the evaporating tower is efficiently and with low costs removed in the existing acid condensing tower of the Wet Gas Sulphuric Acid Plant, and (d) the energy consumption and investments in acid heat exchanges are reduced by feeding the hot acid from the acid condenser of the sulphuric acid plant directly into the top of the evaporating tower.

The strength of the concentrated acid that can be obtained in the evaporating tower is limited by the content of water vapor in the hot gas used for the concentration. Therefore, hot air is preferred rather than hot process gas, e.g. when concentration at least to 98% $H_2SO_4$ is needed and the process gas contains more than about 5% $H_2O$ after a complete hydration of its content of $SO_3$ into $H_2SO_4$ vapor.

The process can, according to the invention also be used for concentration of sulphuric acids combined with dry gas sulphuric acid plants in which the $SO_3$ containing process gas is dry and the $SO_3$ is absorbed in the circulating sulphuric acid. In such cases hot process gas after one of the $SO_2$ conversion steps, preferably process gas at 400–460° C. after the last $SO_2$ conversion step, is used for concentrating the stream of acid. The offgas from the evaporating tower is then condensed in vertical glass tubes of an air-cooled falling film condenser, or in a packed concentrating tower in which the gas is contacted countercurrently with circulating sulphuric that exits the tower at a temperature of 160–260° C.

Other features and advantages of the present invention will become apparent from the following description of the invention which refers to the accompanying drawings.

DESCRIPTION OF THE PREFERRED EMBODIMENTS

Figure 1:
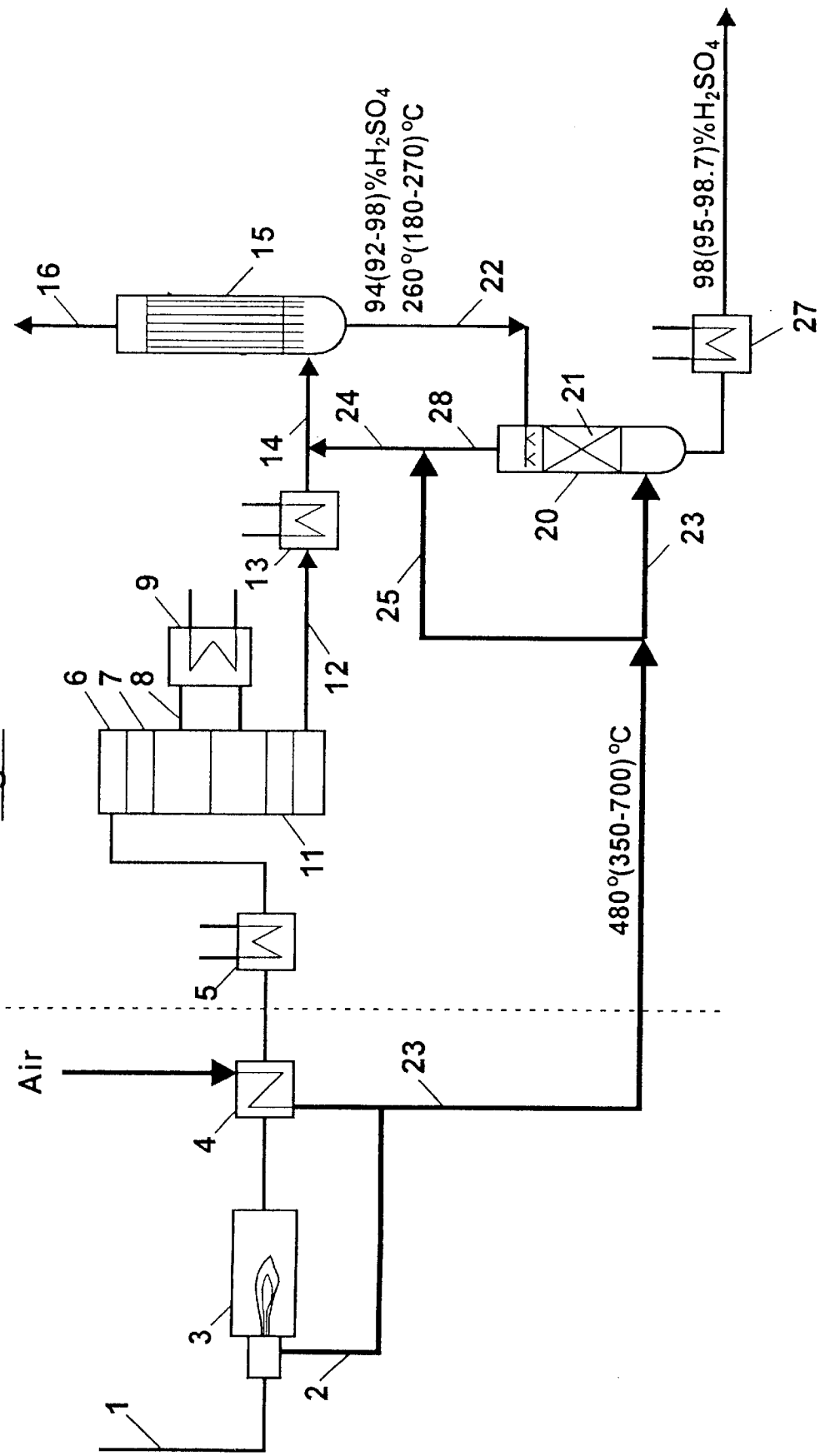
FIGS. 1 to 4 of the drawings each diagrammatically illustrates a different embodiment of the invention.

FIG. 1 shows an embodiment of the invention in which hot air produced in the air heater 4 of a wet gas, sulphuric acid plant comprising the elements 1 through 18 is used for concentration of sulphuric acid in the plant comprising the elements 20 to 27. In the wet gas sulphuric acid plant, waste acid or mixtures of waste acid and other sulphur containing wastes are fed through line 1 into an incinerator 3 in which the waste stream is combusted by support fuel and hot combustion air through line 2 at typically 1000° C. to yield flue gas with 10–25% $H_2O$ and 2–6% $SO_2$. An excess amount of air required for converting the $SO_2$ into $SO_3$ in catalytic $SO_2$ reactor 6 is added to the gas stream. The air for combustion in 3 and concentration in the concentrating tower 21 of the acid from acid condenser 15 is heated to typically 500–550° C. in heat exchanger 4. The flue gas is cooled to about 400° C. by passage through heat exchanger 4 and in 5.

Particles required for the suppression of acid mist boiler formation in sulphuric acid condenser 15 are typically mixed into the process gas in line 12, upstream of the process gas cooler 13 in which the $SO_3$ gas is cooled to a temperature being about 40° C. above the acid dew point of typically 250–265° C. of the $SO_3$ gas in line 12 and 14. The acid condensed in the air cooled condenser 15 leaves the condenser through the line 22 leading it to the top of the packed bed of the concentrating tower 20. The acid in line 22 has typically a concentration of 94% and a temperature of 260° C. The concentration and the temperature of the acid to be concentrated in 21 may be in the range 92–98% $H_2SO_4$ and 180–270° C., respectively, depending on the gas composition inlet to 15 and on the operating conditions of the condenser 15.

The hot air passes through 23 to the bottom of the concentrator 20, below the packing 21 of acid resistant bodies, e.g. ceramic Raschig Rings or saddles. Part of the hot air is bypassed through line 25 to be mixed with the $H_2SO_4$-containing offgas in line 24 in order to evaporate acid mist and raise the temperature in 24 to above the acid dew point of the gas that is mixed the main process gas stream in line 14 of the sulphuric acid plant. The concentrated acid is cooled in 27. In this embodiment of the process, acid of concentrations down to 92–93% can be concentration 98% to 98.5% $H_2SO_4$ with air preheated at 450–500° C. The consumption of hot air increases with decreasing strength of the inlet acid; it is typically about 500 Nm3/h at 500° C. per ton of $H_2SO_4$, when concentrating acid from 93% in line 22 to 98 in line 27. With larger amounts of hot air, the acid strength can be further increased towards the theoretical, azeotropic maximum of 98.7–98.8% $H_2SO_4$.

Figure 2:
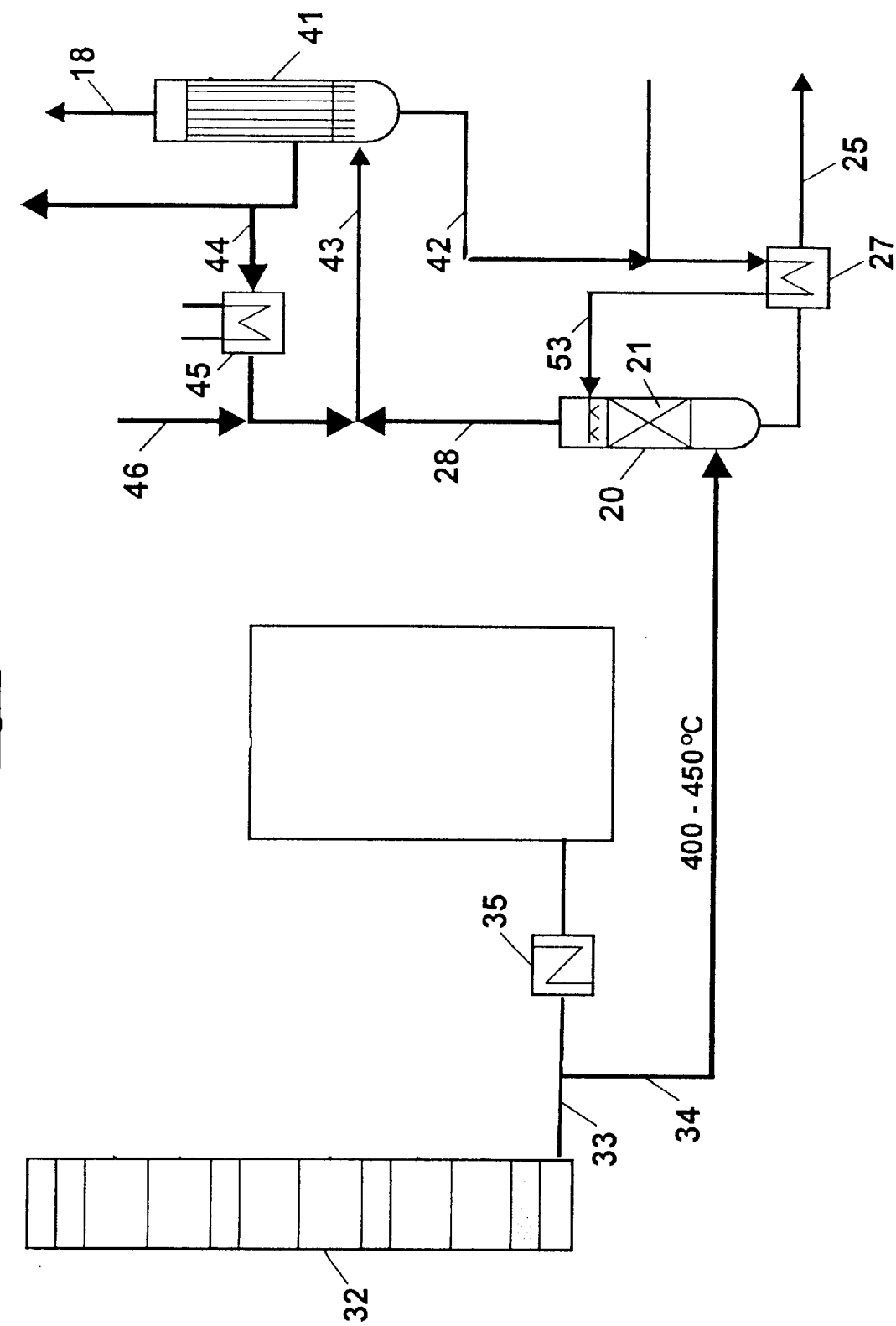

FIG. 2 shows an embodiment of the invention in which the hot gas used for concentrating the acid from condenser 15 is to process at about 400° C. that is taken out in the line 23 from the line 12 after the last $SO_2$ conversion step of the $SO_2$-reactor. The gas from the concentrator 21 is returned to line 14 upstream of the condenser. Some of the gas from line 12 is bypassed through line 25 in order to increase the temperature of the gas in line 24 to above acid dew point.

Figure 3:
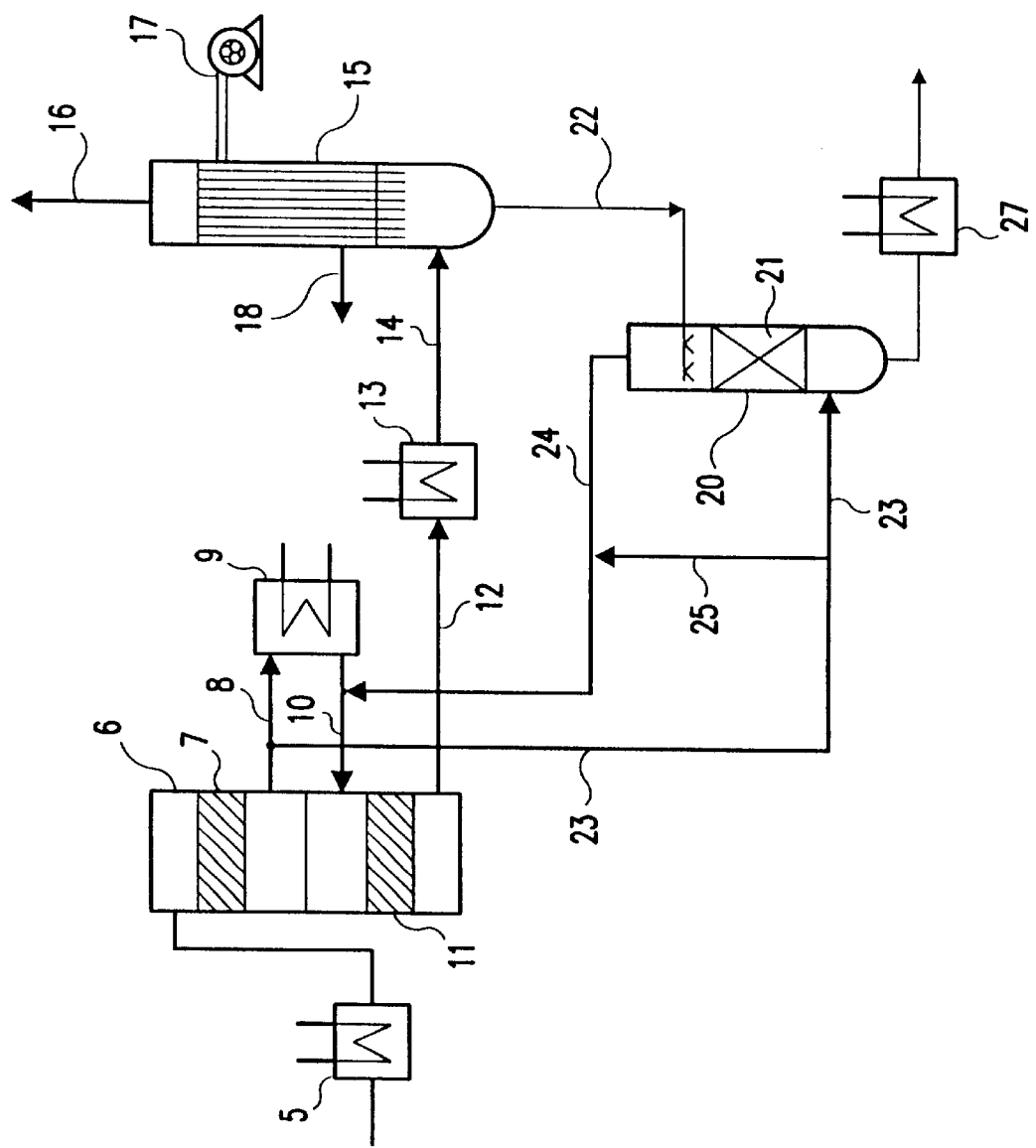

FIG. 3 shows an embodiment of the invention in which process gas at 500–600° C. after the first $SO_2$-conversion step of the wet gas sulphuric acid plant is passed from line 8 to the concentrating tower. The gas from the concentrating tower returns to line 10 upstream of the next $SO_2$-conversion step in order to avoid a decrease of the total $SO_2$-conversion of the plant.

The advantage of the embodiments of the process in FIGS. 2 and 3 is that the hot air is not required for the concentration, while the disadvantage is that 98% acid strength cannot be obtained in practice with process gas that contains more than 12–15% of excess $H_2O$.

Figure 4:
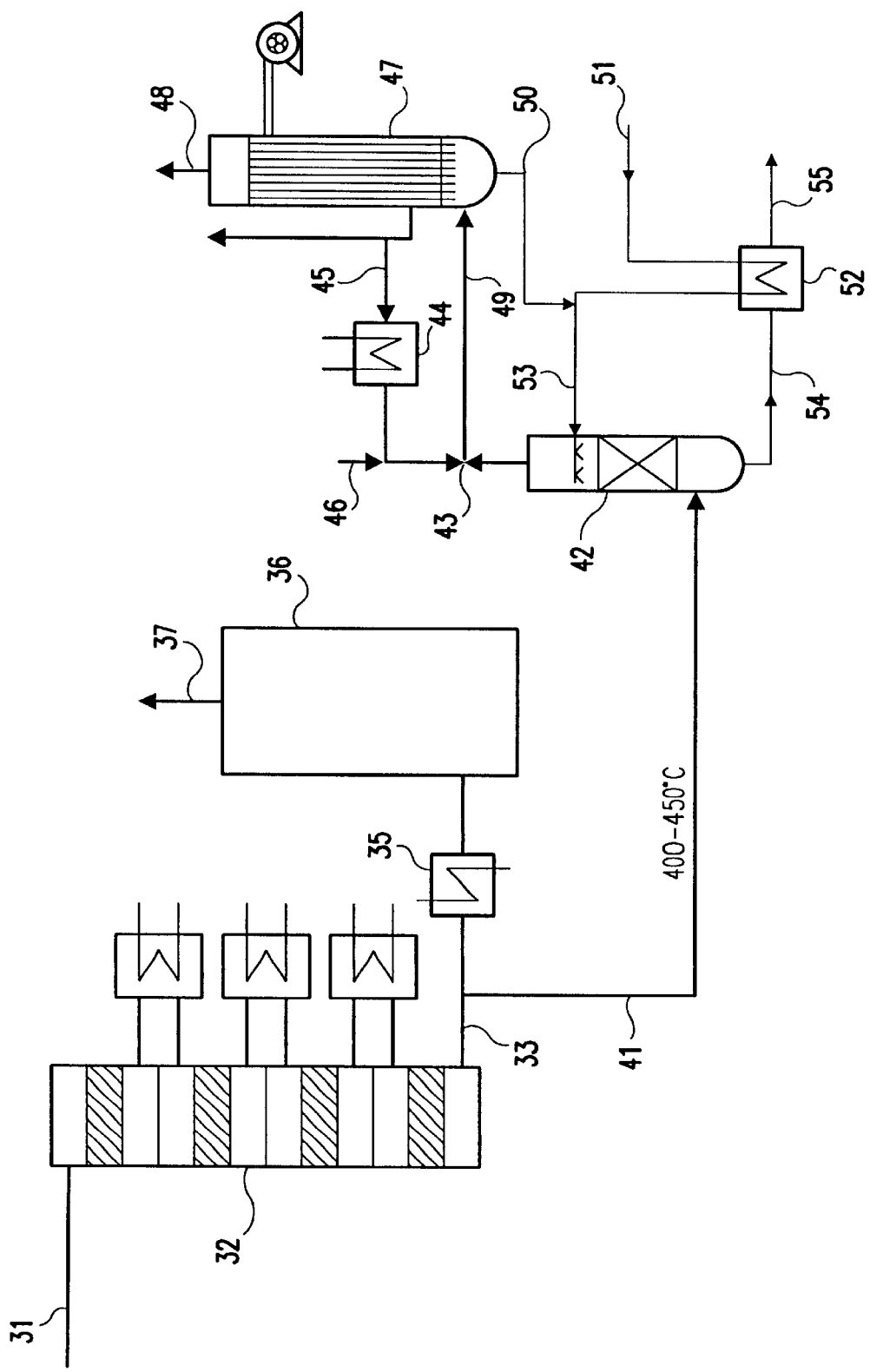

FIG. 4 shows an embodiment of the invention used in combination with a dry gas sulphuric acid plant. A fraction of the dry $SO_3$ gas in the outlet line 3 from the $SO_2$ reactor 2 of a dry gas sulphuric acid plant is taken out through the line 11 to the concentrator 12. The main fraction of the $SO_3$ gas in stream 3 is cooled in the $SO_3$ gas cooler 5 upstream of the $SO_3$ absorber 6 which operates as usual in dry gas sulphuric acid plants. The stream of sulphuric acid to be concentrated is introduced through the line 21 and preheated with the concentrated acid in liquid-liquid heat exchanger 22 before entering the concentrating tower 12. The offgas from the concentrating tower cannot be returned to the dry gas sulphuric acid plant because it contains $H_2O$ and $HSO_4$ vapors. Instead, it is passed to the sulphuric acid condenser 17, in which its content of $H_2SO_4$ is condensed into concentrated sulphuric acid, which through line 20 is mixed into the stream of acid to be concentrated, after that the latter is heated in the heat exchanger 22 by the stream of concentrated acid exiting the concentrating tower 12. The offgas in line 13 from the tower 12 is mixed with an air from the acid condenser 17 taken out through line 15 and further heated in line 14 to typically a temperature of about 250° C. in order to keep the gas in line 19 at minimum of 20° C. above its acid dew point. Particles required for suppressing acid mist formation in 17 is added to the air through line 16.

The embodiment of the invention shown in FIG. 4 is of particular interest in dry gas sulphuric acid plants in which the $H_2O$ content of the feed gases is so high that dilute acid streams cannot be accommodated in the $SO_3$ absorber of the plant.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wet gas sulphuric acid process for concentrating sulphuric acid, the processing comprising the steps of:

supplying a feed stream of sulphuric acid at 150–270° C., the feed stream containing 90–98% $H_2SO_4$, into a contacting zone;

contacting the feed stream with hot atmospheric air to produce a product of sulphuric acid containing 95–98.8% $H_2SO_4$ by directly contacting the feed stream in counter current with the atmospheric air at 350–600° C. to produce the sulphuric acid containing 95–98.8% $H_2SO_4$; and producing an offgas containing sulphuric acid values, and passing the sulphuric acid values through a condensing tower to obtain condensed sulphuric acid values.

2. Process according to claim 1, wherein the sulphuric acid condensing tower comprises air-cooled glass tubes or a packed bed.

3. Process according to claim 1, wherein particles are added to the offgas.

4. In a process for producing sulphuric acid using a wet contact plant, wherein the gases from the converter are passed to a condensation zone to condense out $H_2SO_4$ having a concentration of 90–98% and a temperature of 150–270° C., the improvements which comprise:

passing the acid to a concentrating tower where it is contacted with hot air having at a temperature of 350–600° C. to produce a concentrated acid having a concentration of 96–98.8% and passing vapour from the concentrating tower into the sulphuric acid condensing tower.

* * * * *